May 16, 1961

G. KRAUS 2,984,281

BONDING OF ELASTOMERS

Filed Aug. 27, 1956

INVENTOR.
G. KRAUS

BY *Hudson & Young*

ATTORNEYS

United States Patent Office 2,984,281
Patented May 16, 1961

2,984,281

BONDING OF ELASTOMERS

Gerard Kraus, Bartlesville, Okla., assignor to Phillips Petroleum Company, a corporation of Delaware Filed Aug. 27, 1956, Ser. No. 606,411

17 Claims. (Cl. 152—330)

This invention relates to bonding thermally vulcanizable elastomers to chemical vulcanizates.

I have recently discovered that homopolymers or copolymers prepared by polymerizing monomers containing at least 40 parts by weight of 1,3-butadiene per 100 parts of total monomer can be vulcanized at temperatures of at least 400° F. without incorporating conventional vulcanizing agents in the elastomers. The material to be vulcanized usually contains a filler, such as carbon black or mineral fillers, in order to produce a rubber-like product. When carbon black is employed as the filler, a vulcanizate having good tensile strength, abrasion resistance, resilience, and other desired properties is obtained. Such vulcanizates can be employed to advantage wherever abrasion resistance is a requirement, as for use as treads on tires, for example. Because these vulcanizates do not contain sulfur, they can be used in direct contact with metals, such as copper and silver, which are tarnished by conventional chemical vulcanized elastomers which contain sulfur. This thermal vulcanization process is described in detail in my copending application, Serial No. 534,604, filed September 15, 1955.

In accordance with the present invention, I have discovered that thermally vulcanizable materials of the type described can be bonded to conventionally compounded natural or synthetic rubber vulcanizates by positioning a cushion element of low thermal conductivity between the two elements and heating the assembly under pressure. Both materials are bonded to the cushion element. The conventional chemically vulcanized material requires a much lower vulcanization temperature than does the thermally vulcanizable material. The bonding and vulcanizing can be carried out in a single step by heating the two sides of the laminate to different temperatures.

Accordingly, it is an object of this invention to provide a method of bonding thermally vulcanizable elastomers to chemical vulcanizates.

Another object is to provide laminated rubber articles which are capable of withstanding direct contact by metals that are tarnished by sulfur-containing compounds.

Another object is to provide a method of manufacturing or recapping tires to provide treads of thermally vulcanized elastomers.

Another object is to provide improved tires.

Other objects, advantages and features of this invention should become apparent from the following detailed description which is taken in conjunction with the accompanying drawing in which.

Figures 1, 2, 3:
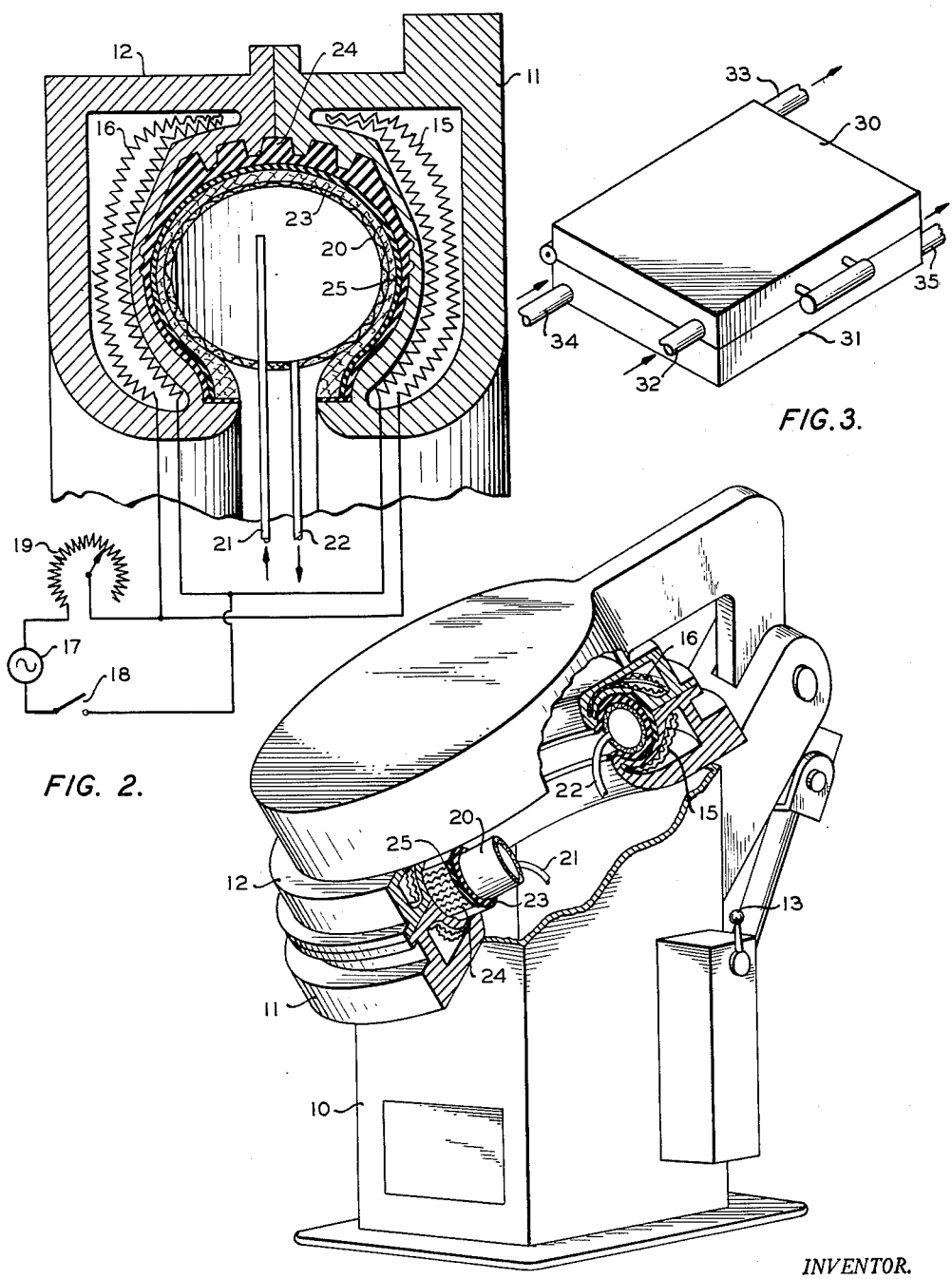
Figure 1 illustrates tire molding apparatus which can be employed to carry out the process of this invention.
Figure 2 is a sectional view of the apparatus of Figure 1.
Figure 3 illustrates a mold which can be employed to fabricate rubber articles.

In the manufacture of tires in accordance with the present invention, a thermally vulcanizable tread is bonded to a conventional chemical vulcanizable carcass. The apparatus illustrated in Figures 1 and 2 can be employed to perform this bonding. This apparatus comprises a base 10 which supports a lower stationary platen 11. An upper platen 12 is hinged to base 10 and can be raised and lowered by suitable mechanical or hydraulic equipment which is actuated by a lever 13. Platens 11 and 12 are provided with electrical heating coils 15 and 16, respectively. These two coils are connected in circuit with a current source 17, a switch 18, and a rheostat 19. Rheostat 19 controls the current to the heating coils so that the temperatures of the platens can be maintained at a desired value. The two platens fit together to form a mold in which the rubber strips that form the tire are shaped. An inflatable bag 20 is positioned inside the tire in the mold to force the tire into engagement with the mold. Bag 20 is provided with an inlet 21 and an outlet 22 so that a fluid can be introduced into the bag to cause inflation thereof. The tire to be manufactured is formed from a carcass 23 and a tread 24. Actually, these two elements are generally formed of a series of plies of rubber and cords. A cushion element 25 is positioned between carcass 23 and tread 24.

In accordance with the present invention, the outer tread or ply 24 is formed of a material which can be vulcanized solely by the application of heat. No chemical vulcanizing agents are required. The carcass 23 is formed of a conventional natural or synthetic rubber material which contains a conventional chemical vulcanizing agent. These two materials are bonded to cushion element 24 and vulcanized simultaneously by the application of pressure and heat. The tread requires a temperature of at least 400° F., whereas the carcass is vulcanized at a considerably lower temperature. The vulcanizing temperature for the tread is provided by heating coils 15 and 16. Air is supplied to bag 20 to maintain the two laminates under pressure. A coolant can be directed through bag 20, if desired, or necessary, to maintain a lower temperature adjacent the carcass.

In Figure 3, there is shown a flat mold comprising upper and lower platens 30 and 31. This mold can be used to fabricate rubber articles such as gaskets, bushings and the like. Platen 30 is provided with a passage through which fluid can be directed by conduits 32 and 33, and platen 31 is provided with a passage through which fluid can be directed by conduits 34 and 35. For example, steam can be supplied to the platen adjacent the thermally vulcanizable elastomer and a coolant can be circulated through the other platen.

Elastomers which can be thermally vulcanized are homopolymers of 1,3-butadiene and copolymers prepared from at least 40 parts by weight of 1,3-butadiene per 100 parts by weight of total monomers. At least 10 parts by weight of a filler such as carbon black or a mineral filler is usually incorporated into the butadiene polymer. Such materials undergo vulcanization when heated to a temperature in the range of 400 to 500° F. When the filler employed is carbon black, a vulcanizate having good tensile strength, abrasion resistance, resilience, and other desirable properties is produced.

Monomers copolymerizable with 1,3-butadiene are other conjugated dienes and those monomers containing a single $CH_2=C<$ group. Examples of such conjugated dienes include isoprene, piperylene, 2-methyl-1,3-pentadiene, 2,3-dimethyl-1,3-butadiene, chloroprene, phenyl butadiene, 2,3-dimethyl-1,3-hexadiene, 2-methoxy-3-ethyl butadiene, 2-ethoxy-3-ethyl1,3-hexadiene, 2-cyano-1,3-butadiene, 2,3-diethyl-1,3-octadiene, and the like. Examples of such monomers include styrene, alkyl-substituted styrene, alpha-methyl styrene, vinylnaphthalene, 2-vinylpyridine, 2-methyl-5-vinylpyridine, 3-phenyl-3-butene-1-ol, acrylic acid, methacrylic acid, methyl acrylate, ethyl acrylate, methyl alpha-chloroacrylate, methyl methacrylate, ethyl methacrylate, acrylonitrile, methacrylonitrile, methyl isopropenyl ketone, methyl vinyl ketone, methyl vinyl ether, vinyl acetate, vinyl chloride, vinylidene chloride, vinylfurane, vinylcarbazole, and the like. It is to be understood that 1,3-butadiene can be copolymerized with one or more of the copolymerizable materials or that the 1,3-butadiene can be polymerized alone. The examples of said application Serial No. 534,604 illustrate that butadiene must be one of the monomers, however.

Filler materials used in the stock to be thermally vulcanized include carbon black and mineral fillers. Examples of suitable carbon blacks include furnace blacks such as high abrasion, fast extrusion, and super abrasion furnace blacks; channel blacks; and thermal blacks. Examples of suitable mineral fillers include kaolin, hydrated silica, alumina, calcium silicate, calcium carbonate, aluminum silicate, titanium oxide, and the like. The amount of filler is generally in the range of 10 to 150 parts by weight per 100 parts of polymer.

The filler can be incorporated into the polymer by any known method such as by mixing on a rubber mill or in an internal mixer, or it may be incorporated by a latex masterbatching precedure. A plasticizer can be added if desired, but in no case is a vulcanizing agent employed.

Elastomers which are compounded according to conventional recipes, i.e., recipes containing a vulcanizing agent such as sulfur, dicumyl peroxide, chloranil, tetramethyl thiuram disulfide, or other sulfur-containing vulcanizing agent, a vulcanization accelerator, plasticizer, reinforcing agent, and the like, and which are bonded to elastomers containing no curatives in accordance with the process of this invention, include natural rubber and synthetic rubbery polymers of conjugated dienes having from 4 to 12 carbon atoms per molecule, exemplified by 1,3-butadiene, 2,3-dimethyl-1,3-butadiene, and the like or the rubbery copolymers of these and similar conjugated dienes with each other or with copolymerizable materials containing a single $CH_2=C<$ group as described above. Rubbery polymers and copolymers of such conjugated dienes as chloroprene are also applicable. The addition of compounding ingredients can be effected by any means known in the art.

Strong bonds between the two plies are obtained by positioning a cushion element between the plies. This cushion element has low heat conductivity and is formed of natural rubber, synthetic rubber, or a mixture of the rubbers, which is compounded with a carbon black that has a low thermal conductivity and high reinforcing power, such as a super abrasion furnace black. Since the two plies require widely different temperatures to effect vulcanization, portions of the two plies may be undercured or overcured near the boundary area in the absence of the cushion element. The outer plies of the laminate can be made any desired thickness, but as the thickness is increased, the thickness of the cushion element is generally increased. The thickness of the cushion element is generally from 0.25 to 0.75 of the outside layers, and preferably from 0.33 to 0.5 as thick as the outside layers.

It is sometimes desirable to employ a cement between the cushion element and the chemically vulcanizable ply. Such a cement is prepared by dissolving a portion of the cushion element stock in a solvent such as benzene, toluene and the like. This cement facilitates the bonding of elements.

The cushion element employed in bonding thermally vulcanized to chemically vulcanized rubber is unique. Either natural or synthetic rubber or blends of various rubbers can be used. The quantity of vulcanizing agent is generally kept lower than it would be for a stock compounded in the normal manner, below 1.5 parts by weight sulfur per 100 parts rubber, for example. A special carbon black is used, i.e., one which has high reinforcing power and low thermal conductivity. The amount of carbon black is also kept at a relatively low level, generally not more than 30 parts by weight per 100 parts of rubber. The cushion stock is of such nature that it would be greatly undercured under conditions ordinarily used for conventionally compounded stocks and would become very hard when cured under conditions used for thermal vulcanization. When curing time and temperature are regulated to give satisfactory vulcanization of the two types of stocks to be bonded, the cushion element is also vulcanized in a satisfactory manner. Certain white fillers such as high surface alumina or silica having low thermal conductivity and good reinforcing power are likewise applicable. Loading of these materials is similar, in a volume respect, to that of carbon black.

There are several procedures by which the two plies can be bonded to the cushion element by the process of this invention. The first involves heating the side of the laminate containing the thermally vulcanizable elastomer to a temperature in the range of 400 to 500° F. and maintaining the chemically vulcanizable side at a lower temperature. This can readily be accomplished by the molds illustrated in the drawing. The two materials are thus vulcanized and bonded to the cushion element in one step.

An alternative procedure comprises a preliminary curing of the stock containing the chemical curatives, followed by assembling the members of the laminate, and finally curing in a mold under pressure as previously described. The curing utilizes a temperature on the side of the laminate adjacent to the stock containing the chemical curatives which is generally no higher than that required for vulcanization. The temperature on the remaining side must be raised to the level required for thermal vulcanization.

It is sometimes preferred to form a laminate by first curing the stock to be thermally vulcanized and then vulcanizing the stock containing the chemical curatives onto it by placing the assembly in a mold under pressure and heating the structure at the temperature required for vulcanizing the uncured ply.

Another variation in the procedure involves assembling the members that are to be bonded and curing the two plies of the laminate consecutively. The entire laminate is initially heated to a temperature sufficient to vulcanize the side containing the chemical curatives. Then the temperature of the platen adjacent to the stock to be thermally vulcanized is raised to the level required for curing that stock and maintained at that level for the required period. Water or other coolant is circulated through the second platen as required to maintain the temperature of the stock containing chemical curatives at a lower level.

The following examples are illustrative of the invention.

*Examples*

A 75/25 butadiene/styrene rubber containing carbon black and no curatives was vulcanized through a cushion element onto a conventionally compounded 75/25 butadiene/styrene rubber and also onto a conventional compounded natural rubber (No. 1 Smoked Sheet). The butadiene/styrene copolymer was prepared by emulsion polymerization at 41° F. and had a Mooney value (ML–4) of 52±6. The copolymer was prepared by the following recipe:

| | Parts by weight |
|---|---|
| Butadiene | 75 |
| Styrene | 25 |
| Water | 180–200 |
| Rosin soap, potassium salt | 4.5 |
| Tamol N [1] | 0.15 |
| $Na_3PO_4 \cdot 10H_2O$ | 0.80 |
| p-Menthane hydroperoxide | 0.12 |
| $FeSO_4 \cdot 7H_2O$ | 0.20 |
| $K_4P_2O_7$ | 0.30 |
| Tert-dodecylmercaptan | As required for 52±6 ML–4 |

[1] Sodium salt of a naphthalene sulfonic acid condensed with formaldehyde.

Shortstop: Parts by weight
  Sodium or potassium dimethyly dithiocarbamate _____ 0.15
  Polamine H [2] _____ 0.10

Antioxidant: BLE [3] (percent, based on rubber)_ 1.25
Polymerization temperature, °F. _____ 40–43
Conversion, percent _____ 60
Mooney value, ML–4 at 212° F. _____ 52±6

[2] Kettle bottoms from manufacture of ethyleneamines, mostly pentaethylenehexamine and hexaethyleneheptamine with some tetraethylenepentamine.
[3] High temperature reaction product of diphenylamine and acetone.

The polymer was coagulated by the salt-acid method. It had a bound styrene content of 20±1 weight percent. The material employed as the cushion element was a 75/25 butadiene/styrene rubber, natural rubber (No. 1 Smoked Sheet), or a 50/50 blend of these rubbers. It was compounded by using conventional curative, but at lower concentrations than normally employed. A high reinforcing carbon black of low thermal conductivity was employed.

The compounding ingredients were added to each of the rubbers on the mill and each stock was sheeted out to a thickness of approximately 0.075 inch. Compounding recipes were as follows:

| | Parts by Weight | | | | | |
|---|---|---|---|---|---|---|
| | A | B | C | D[5] | E[5] | F[5] |
| Butadiene/styrene rubber | 100 | 100 | | 100 | | 50 |
| No. 1 Smoked Sheet | | | 100 | | 100 | 50 |
| Carbon Black [1] | 50 | 50 | 50 | | | |
| Carbon Black [2] | | | | 25 | 25 | 25 |
| Zinc Oxide | | 3 | 4 | 3 | 4 | 3.5 |
| Stearic acid | | 1 | 3 | 1 | 3 | 2 |
| Flexamine [3] | | 1 | 1 | 1 | 1 | 1 |
| Sulfur | | 1.75 | 2 | 1.25 | 1.4 | 1.3 |
| Santocure [4] | | 1 | 0.5 | 0.8 | 0.4 | 0.6 |

[1] High abrasion furnace black.
[2] Super abrasion furnace black.
[3] Physical mixture containing 65 percent of a complex diarylamineketone reaction product and 35 percent of N,N'-diphenyl-p-phenylenediamine.
[4] N-cyclohexyl-2-benzothiazylsulfenamide.
[5] Cushion stocks.

Laminates were assembled using the two types of stocks to be bonded with a cushion element disposed between them, and then cured in a slab mold under pressure at various platen temperatures. A cement, prepared by dissolving 5 grams of the cushion stock in 100 cc. of benzene, was employed in several runs. It was used between the cushion element and the sulfur-containing stock. Slabs 6" x 6" were used and strips of aluminum foil one inch wide were placed across one edge to prevent bonding in this area. Some laminates were prepared from pre-formed vulcanizates, i.e., the stock containing sulfur and other compounding ingredients was cured 30 minutes at 307° F. and the surface was roughened with No. 2½ Garnet paper prior to forming the laminates. Other laminates were prepared in which both plies were uncured when the structure was assembled. When an uncured stock to be thermally vulcanized was bonded to a pre-formed vulcanizate, the temperature of the platen adjoining the sulfur-containing stock was maintained at the low level required by circulating water through the platen as needed. An electric platen was used to regulate the temperature on the side adjoining the stock to be thermally vulcanized. The assembly was then cured and removed from the mold. Test strips 1" x 6" were cut from the cured laminates. Cutting was done perpendicular to the aluminum foil so that each strip contained an unbonded portion one inch in length at one end. These free ends, or unbonded portions, were placed in the jaws of an Instron tester and the pull required for failure was measured in pounds per inch. The types of laminates, time and temperature of curing, and results of the stripping test are shown in the table which follows. Several runs prepared without the use of a cushion element are included for comparative purposes.

| Type of Laminate | Average Temperature Of Platens, F.[1] | Cure Time, Minutes | Stripping Test, Pull, Lbs./In. |
|---|---|---|---|
| A to D to B | 500 and 250 | 45 | [2] 42 |
| A to B | 490 and 250 | 45 | [3] 46 |
| A to D to vulcanized C | 490 and 89 | 45 | [3] 33 |
| A to vulcanized C | 443 and 105 | 60 | [4] 12–20 |
| A to D to C | 500 and 250 | 45 | [5] 22.7 |
| A to C | 500 and 250 | 45 | [5] 19.5 |
| A to E to C | 500 and 250 | 45 | [5] 26.6 |
| A to F to C | 500 and 250 | 45 | [5] 28.3 |
| A to D to vulcanized B | 490 and 150 | 45 | [7] 32.3 |
| A to D to Cement D to vulcanized B | 490 and 150 | 45 | [7] 30.2 |
| A to D to vulcanized C | 490 and 150 | 45 | [7] 32.4 |
| A to E to vulcanized C | 490 and 150 | 45 | [8] 20.7 |
| A to F to vulcanized C | 500 and 150 | 45 | [9] 38.6 |
| A to D to Cement D to vulcanized C | 490 and 150 | 45 | [7] 27.8 |
| A to F to Cement F to vulcanized C | 500 and 150 | 45 | [10] 38.4 |

[1] The platen having the higher temperature is that adjacent to the stock to be thermally vulcanized.
[2] Maximum value not obtained as thermally vulcanized stock broke.
[3] Failure occurred at bond.
[4] Failure occurred at bond. Some areas of weaker bonding account for a variation in the pull.
[5] Failure occurred in C.
[6] Failure occurred in E, then in C.
[7] Failure occurred in D (cushion element).
[8] Failure occurred in E (cushion element).
[9] Failure occurred in A.
[10] Failure occurred in F (cushion element).

The foregoing examples clearly demonstrate the effectiveness of the bonding and vulcanizing process of this invention. While the invention has been described in conjunction with present preferred embodiments, it should be evident that it is not limited thereto.

What is claimed is:

1. A method of forming a laminated cured rubber which comprises positioning a first ply of rubber selected from the group consisting of natural and synthetic rubber, and containing a vulcanizing agent, in contact with the first side of a second ply of an elastomer containing a vulcanizing agent and a low thermal conductivity filler, positioning a third ply of a polymeric elastomer prepared by polymerizing monomeric material comprising at least 40 parts by weight 1,3-butadiene per 100 parts total monomer, the remaining monomer being selected from the group consisting of conjugated dienes and monomers having a single $CH_2\!\!=\!\!C\!\!<$ group, in contact with the second side of said second ply, and heating the third ply to a temperature of at least 400° F. for a period of time sufficient to cause the polymeric elastomer to cure in the absence of a vulcanizing agent.

2. The method of claim 1 which comprises curing the first ply prior to positioning same in contact with the second ply and maintaining the temperature of the first ply considerably lower than 400° F. during the time the third ply is being cured.

3. The method of claim 1 wherein the three plies are cured simultaneously which comprises maintaining the temperature of the first ply at a curing temperature which is considerably lower than 400° F. at the time the third ply is heated to the temperature of at least 400° F.

4. The method of claim 1 wherein said second ply contains a smaller percentage of vulcanizing agent than does said first ply.

5. The method of claim 2 which further comprises positioning a cement between said first and second plies, said cement comprising material of said second ply dissolved in a solvent therefor.

6. A method of forming a laminated cured rubber which comprises positioning a first ply of rubber selected from the group consisting of natural and synthetic rubber, and containing a vulcanizing agent, in contact with the first side of a second ply of rubber selected from the group consisting of natural and synthetic rubber and containing a vulcanizing agent in an amount less than 1.5 parts by weight sulfur per 100 parts rubber and a low thermal conductivity carbon black in an amount not in excess of 30 parts by weight per 100 parts rubber, positioning a third ply of a polymeric elastomer prepared by polymerizing monomeric material comprising at least 40 parts by weight, 1,3-butadiene per 100 parts total monomer, the remaining monomer being selected from the group consisting of conjugated dienes and monomers having a single $CH_2=C<$ group, in contact with the second side of said second ply, said polymeric elastomer having from 10 to 150 parts by weight per 100 parts of polymer of a filler incorporated therein, and heating the third ply to a temperature of at least 400° F. for a period of time sufficient to cause the polymeric material to cure in the absence of a vulcanizing agent.

7. A method of forming a laminated cured rubber which comprises positioning a first ply of rubber selected from the group consisting of natural and synthetic rubber, and containing a vulcanizing agent, in contact with the first side of a second ply of an elastomer containing a vulcanizing agent and a low thermal conductivity filler, positioning a third ply of a polymeric elastomer in contact with the second side of said second ply, said polymeric elastomer being prepared by polymerizing monomeric material comprising a major part of 1,3-butadiene and a minor part of styrene, said polymeric elastomer having at least 10 parts by weight per 100 parts of polymer of a filler incorporated therein, and heating the third ply to a temperature of at least 400° F. for a period of time sufficient to cause the polymeric material to cure in the absence of a vulcanizing agent.

8. A cured rubber laminate comprising a first ply of cured rubber selected from the group consisting of natural and synthetic rubber, having a vulcanizing agent incorporated therein, a third ply of a polymeric elastomer prepared by polymerizing monomeric material comprising at least 40 parts by weight 1,3-butadiene per 100 parts total monomer, the remaining monomer being selected from the group consisting of conjugated dienes and monomers having a single $CH_2=C<$ group, said third ply being free of a vulcanizing agent and having been cured at a temperature of at least 400° F., and a second ply positioned between said first and third plies, said second ply comprising an elastomer containing a vulcanizing agent and a low thermal conductivity filler, at least one of said first and third plies having been cured while in contact with the second ply.

9. A cured rubber laminate comprising a first ply of cured rubber selected from the group consisting of natural and synthetic rubber, having a vulcanizing agent incorporated therein, a third ply of a polymeric elastomer prepared by polymerizing monomeric material comprising at least 40 parts by weight, 1,3-butadiene per 100 parts total monomer, the remaining monomer being selected from the group consisting of conjugated dienes and monomers having a single $CH_2=C<$ group, said polymeric elastomer having at least 10 parts by weight per 100 parts of polymer of a filler incorporated therein, said third ply being free of a vulcanizing agent and having been cured at a temperature of at least 400° F., and a second ply positioned between said first and third plies, said second ply comprising a rubber selected from the group consisting of natural and synthetic rubber and containing a vulcanizing agent in an amount less than 1.5 parts by weight sulfur per 100 parts rubber and a low thermal conductivity carbon black in an amount not in excess of 30 parts by weight per 100 parts rubber, at least one of said first and third plies having been cured while in contact with the second ply.

10. A tire comprising a carcass comprising a cured rubber selected from the group consisting of natural and synthetic rubber, having a vulcanizing agent incorporated therein, and a tread bonded thereto, said tread comprising a polymeric elastomer prepared by polymerizing monomeric material comprising at least 40 parts by weight 1,3-butadiene per 100 parts total monomer, the remaining monomer being selected from the group consisting of conjugated dienes and monomers having a single $CH_2=C<$ group, said tread being free of vulcanizing agent and having been cured at a temperature of at least 400° F., said tread having at least 10 parts by weight per 100 parts of polymer of a filler incorporated therein, said tread being bonded to the carcass by means of an intermediate ply positioned between said carcass and said tread, said intermediate ply comprising a rubber selected from the group consisting of natural and synthetic rubber and containing a vulcanizing agent in an amount less than 1.5 parts by weight sulfur per 100 parts rubber and a low thermal conductivity carbon black in an amount not in excess of 30 parts by weight per 100 parts rubber, at least one of the inner and outer plies of the tire having been cured while in contact with the intermediate ply.

11. The tire of claim 10 wherein said filler comprises carbon black.

12. The tire of claim 11 wherein said polymeric material is a copolymer of 1,3-butadiene and styrene.

13. The method of manufacturing a tire which comprises forming the carcass of a first material comprising rubber selected from the group consisting of natural and synthetic rubber, and containing a vulcanizing agent, forming the tread of a polymeric elastomer prepared by polymerizing monomeric material comprising at least 40 parts by weight 1,3-butadiene per 100 parts total monomer, the remaining monomer being selected from the group consisting of conjugated dienes and monomers having a single $CH_2=C<$ group, said tread having at least 10 parts per 100 parts by weight of polymer of a filler incorporated therein, positioning an intermediate ply of material on said carcass which comprises a rubber selected from the group consisting of natural and synthetic rubber and containing a vulcanizing agent in an amount less than 1.5 parts by weight sulfur per 100 parts rubber and a low thermal conductivity carbon black in an amount not in excess of 30 parts by weight per 100 parts rubber, positioning the tread on said material, and heating the tread to a temperature of at least 400° F. for a period of time sufficient to cause the tread to cure in the absence of a vulcanizing agent.

14. The method of recapping a tire which comprises positioning on the tire a ply of material which comprises a rubber selected from the group consisting of natural and synthetic rubber and containing a vulcanizing agent in an amount less than 1.5 parts by weight sulfur per 100 parts rubber and a low thermal conductivity carbon black in an amount not in excess of 30 parts by weight per 100 parts rubber, positioning on said ply to form a tread, a layer of a polymeric elastomer prepared by polymerizing monomeric material comprising at least 40 parts by weight 1,3-butadiene per 100 parts total monomer, the remaining monomer being selected from the group consisting of conjugated dienes and monomers having a single $CH_2=C<$ group, said elastomer having at least 10 parts per 100 parts by weight of polymer of a filler incorporated therein, and heating said polymeric material to a temperature of at least 400° F. for a period of time sufficient to cause the tread to cure in the absence of a vulcanizing agent.

15. The method of claim 14 wherein said polymeric elastomer comprises a copolymer of butadiene and styrene and said filler comprises carbon black.

16. The method of claim 6 wherein said filler comprises carbon black.

17. The method of claim 6 wherein said filler comprises a mineral filler.

References Cited in the file of this patent

UNITED STATES PATENTS

| | | |
|---|---|---|
| 1,463,987 | Wildman | Aug. 7, 1923 |
| 1,480,976 | Wight | Jan. 15, 1924 |
| 1,640,800 | Peterson | Aug. 30, 1927 |
| 2,467,322 | Lightbown et al. | Apr. 12, 1949 |
| 2,575,378 | Bender | Nov. 20, 1951 |
| 2,653,884 | Hussey et al. | Sept. 29, 1953 |
| 2,742,942 | Owen | Apr. 24, 1956 |
| 2,749,960 | Schwartz | June 12, 1956 |
| 2,824,038 | Wilson et al. | Feb. 18, 1958 |
| 2,825,662 | McKay et al. | Mar. 4, 1958 |